Jan. 10, 1950 N. O'N. CHRISTY 2,494,035
ELECTRIC FURNACE
Filed Feb. 3, 1947 2 Sheets-Sheet 1

INVENTOR
NIXON O'NEIL CHRISTY
BY
Cook and Schermerhorn
ATTORNEYS

Jan. 10, 1950  N. O'N. CHRISTY  2,494,035
ELECTRIC FURNACE

Filed Feb. 3, 1947  2 Sheets-Sheet 2

INVENTOR
NIXON O'NEIL CHRISTY

BY Cook and Schermerhorn
ATTORNEY

Patented Jan. 10, 1950

2,494,035

UNITED STATES PATENT OFFICE 2,494,035

ELECTRIC FURNACE

Nixon O'Neil Christy, Portland, Oreg., assignor to Herman J. Maulbetsch, Portland, Oreg.

Application February 3, 1947, Serial No. 726,003

11 Claims. (Cl. 219—39)

This invention relates to an electric furnace of the heat storage type for use with a hot air duct system for heating dwelling houses and other buildings.

For economical house heating by electricity it is desirable to avoid energization of the heating elements during peak load periods in each day when the cost of electrical power for heating loads is higher than at other times. In the interests of economy, it is also desirable to avoid an excessive maximum demand for electrical power by the furnace at times when there may be an unusually large heat demand, as, for instance, when warming the house in the morning. The general objects of the present invention are to satisfy these conditions in an improved electric furnace having a substantial heat storage mass maintained constantly at a high temperature by electric heating elements which are energized only in off peak periods of the power system from which the electrical energy is obtained. Through the provision of a damper control responsive to heat demand, hot air is drawn from the furnace, either continuously or intermittently, as required, by virtue of the heat storage capacity thereof, and without regard to the energization and de-energization intervals of the electric heating elements. It is intended that the heat storage capacity of the furnace be sufficient to supply heat for a limited time far in excess of the output rate of the electric heating elements contained in the furnace, and to supply heat at a normal rate beyond the duration of the longest peak load period when the heating elements are switched off. In power distribution systems serving cities there are ordinarily two major peak load periods in each day, usually consisting of about a two-hour period in the morning and a similar period in the early evening. It has been found that a mass of solid heat storage material occupying no more space than the usual fuel furnace, will provide sufficient thermal capacity to satisfy the normal heat demands during these periods and will, in addition, be capable of supplying extra heat for warming up the house in the morning without the assistance of the electric heating elements during the peak load period.

Other objects and advantages of the invention will become apparent from the description of the preferred embodiment illustrated on the accompanying drawings.

Figure 1:
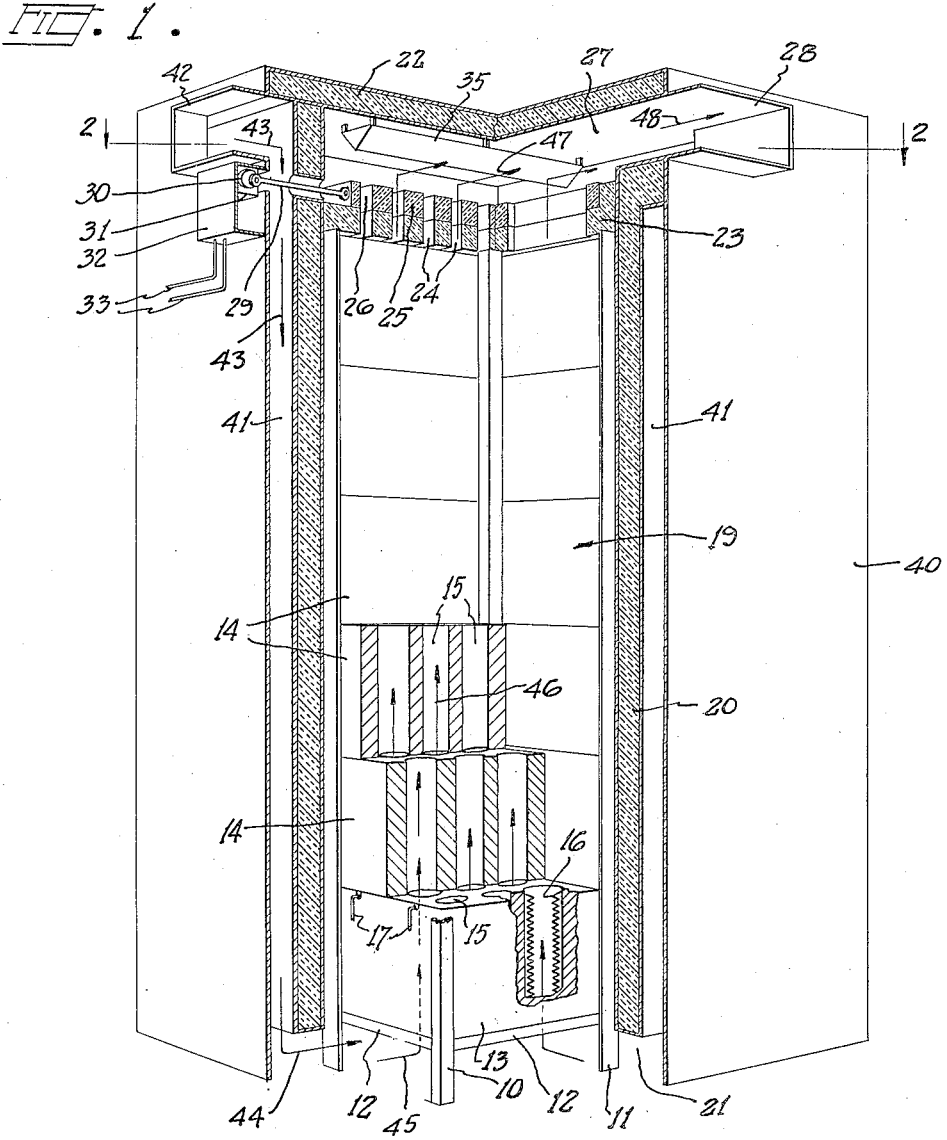
Figure 1 is a perspective view of an electric furnace embodying the principles of the invention, certain parts being shown in section to reveal the internal construction.
Figure 2:
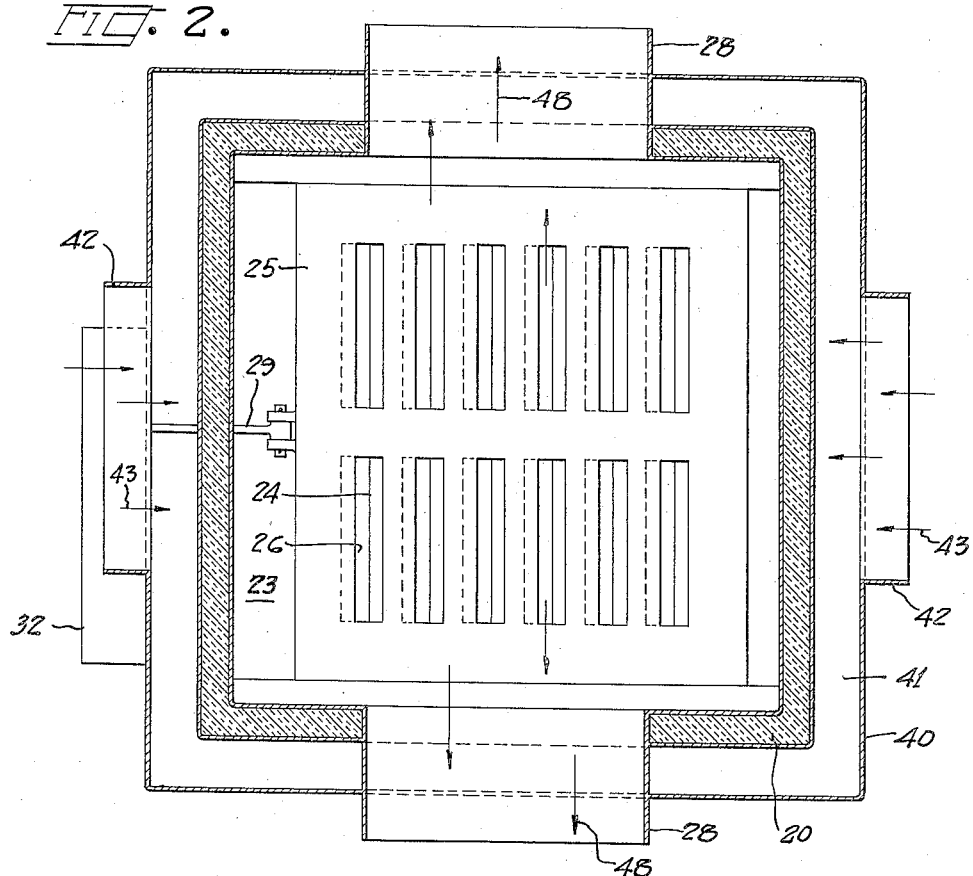
Figure 2 is a horizontal sectional view, taken on the line 2—2 of Figure 1.

As shown in Figure 1, the heat storage mass comprises four tiers of heat accumulator blocks supported in a metal frame 10 which is adapted to stand on a concrete or other suitable base forming the floor of the furnace. The frame 10 may be fabricated from angle irons or other structural metal forms to provide a plurality of legs or uprights 11 interconnected by horizontal rails 12. The lowermost rails 12 are spaced from the ends of the legs 11 to support four element blocks 13 at a distance above the floor of the furnace. Above each element block 13 is stacked a tier of accumulator blocks 14 which may rest one upon another and directly upon the element blocks, or which may be supported on additional horizontal rails (not shown) to leave a slight clearance above the top of the element blocks so that the latter are free for insertion and removal without disturbing the accumulator blocks. The legs 11 are spaced to permit the blocks to be inserted and removed therebetween. The blocks 13 and 14 may be inexpensively cast from cementitious material and a suitable aggregate having relatively high density and specific heat, so that they will have greater heat storage capacity and better refractory qualities than ordinary concrete, although ordinary concrete, or any other similar material may be used at temperatures which will not disintegrate the blocks.

The blocks are formed with a plurality of vertical openings 15 which are aligned in the tiers to promote convection currents of hot air when the blocks are heated. The element blocks 13 are identical with the accumulator blocks 14, except that resistance heating elements 16 are inserted in the openings of the element blocks. The resistor for these blocks may be coiled or disposed in any other convenient arrangement within the openings 15, and it is preferred to form the heating elements in the openings in each block in series from a single resistor having ends 17 which may be brought out as terminals on one of the outside faces of the block.

By coiling the resistor within the block openings in this manner instead of embedding it in the blocks the air passing through the openings is heated quickly and to a high temperature by direct contact with the resistor to heat the overlying accumulator blocks by conduction from the hot air as it rises, in addition to the heat transmitted upward by radiation and conduction from the element blocks as they get hot. This exposed condition of the resistor also has the advantage of providing an immediate supply of hot air upon energization after a shut down, without waiting for any part of the storage mass to become heated. Thus whenever there is occasion to start operation of the furnace from a cold condition the hot air produced by direct contact with the heating elements may be confined to heat the accumulator blocks or it may be released immediately for house heating purposes.

The four pairs of terminals 17 from the four element blocks are energized by a suitable control circuit having thermostat regulation to maintain a predetermined temperature near the top of the heat storage mass during off peak periods. Thermostatic control may be provided by an elongated temperature responsive element in the form of a conventional bonnet thermostat inserted between the accumulator blocks a short distance below the top of the tiers. In this way a temperature of at least 300° F. may be maintained at the thermostat level during off peak periods, the heat being transferred upwardly from the element blocks by conduction, convection and radiation in accordance with the temperature gradient. During a heating interval the element blocks 13 may attain a temperature much higher than 300°, but after the heating elements are switched off the temperature tends to equalize throughout the height of the tiers without reaching an excessive value at any point. Whenever the temperature at the thermostat level falls below 300° during an off peak period the heating elements are again switched on to supply more heat to the storage mass, it being, of course, understood that this particular temperature is referred to merely by way of example, and that either higher or lower temperatures may be employed consistent with the refractory qualities of the blocks and insulating materials used in the furnace, the heat requirements of the building, and the lengths of the high rate peak load periods of the power supply system. The control circuit includes a conventional clock switch operative to prevent energization of the heating elements during the peak load periods whereby the heating intervals called for by cooling of the storage blocks may be either prematurely shortened or delayed when they overlap a peak load period. This control circuit comprises conventional instrumentalities and is not illustrated.

The frame 10 is enclosed by a heavy sheet or thickness of insulating material 20, which thereby forms four side walls around the heat storage mass to define and enclose a heating chamber 19. This insulating material may take the form of individual interfitting panels on each of the four sides of the frame 10, and must, of course, be of a composition to withstand the constant high temperatures within the heating chamber. A space 21 is left between the floor of the furnace and the lower edge of the insulating sheet 20 to provide an air passage under the element blocks 13. The top edge of the insulating wall or sheet 20 joins an insulating panel 22 forming the top of the furnace.

Spaced slightly above the uppermost accumulator blocks is an insulating wall 23 which forms the top of the heating chamber 19. This wall is provided with a plurality of openings 24 which are adapted to be uncovered in varying amounts by an insulating damper 25. The damper 25 has openings 26 to coincide with the openings 24 in one extreme position of sliding movement to allow maximum flow of hot air to rise through these openings into a hot air space 27 forming a distribution chamber having outlets 28 for connection with the hot air duct system of the house to be heated. The damper 25 is moved by a link 29 connected with a crank 30 on a damper control motor 31 in a control box 32 mounted on the outside wall of the furnace. By means of control wires in the conduits 33, the damper control motor is operated from time to time to shift the position of the damper 25 in accordance with the heat demand of a room thermostat or other conventional temperature control system. The arrangement is such that when there is no demand for heat the damper 25 completely seals the openings 26 to effectively prevent the escape of hot air from the heating chamber into the hot air space 27, and, inasmuch as both the wall 23 and damper 25 constitute thick layers of insulating material, thermal loss into the space 27 is effectively prevented when the damper is closed. The numeral 35 designates a humidifier pan to hold water for adding moisture to the hot air delivered by the furnace. The water supply for the humidifier may be controlled by any conventional means.

Spaced from and surrounding the insulating wall 20 on all sides is the outer casing 40 of the furnace extending from the top 22 to the floor or furnace base. There is thus left a space 41 to serve as an air return space and to prevent any heat loss that may take place through the insulation 20 by slightly preheating the incoming air. The casing 40 is provided with one or more connections 42 for cold air return conduits to admit returning air as indicated by the arrows 43. This returning air then passes down through the space 41 on all sides of the furnace, and is drawn through the space 21 beneath the lower edge of the wall 20, as indicated by the arrow 44. Upon passing upwardly through the openings 15 in the elements blocks 13 and accumulator blocks 14, as indicated by the arrows 45 and 46, the air becomes highly heated and passes out the top of the heating chamber through openings 24 and 26, as indicated by the arrows 47. In the hot air space 27 the air is humidified and then distributed into the hot air duct system, as indicated by the arrows 48.

Figure 3:
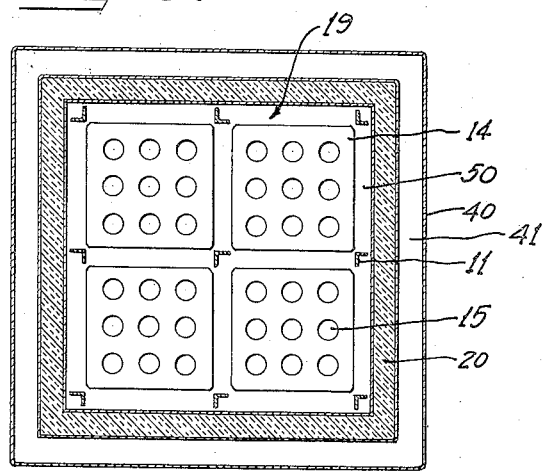
Figure 3 is a sectional view on a smaller scale and taken on a lower level to show the arrangement of the heat storage blocks in the heating chamber within the furnace.

When the damper 25 is closed, hot air rising through the accumulator blocks may flow across the top of the uppermost blocks and down around the sides of the blocks in the space indicated at 50 in Figure 3 to establish sufficient circulation within the heating chamber to distribute the heat and tend to equalize the temperature in all the accumulator blocks so that a dangerous temperature gradient will not build up in the heating chamber when the damper is closed for long periods of time. The furnace is designed so that the damper 25 may remain closed indefinitely without damage to any part of the furnace, the heating elements being automatically switched off when the upper accumulator blocks at the thermostat level reach a predetermined temperature. There is thus maintained a solid heated mass of over two tons in a furnace of ordinary size which is always available to supply a large amount of heat instantly on demand at any time and without regard to whether or not the electric heating elements are active at the time. The thermal capacity of this storage mass being sufficient to supply the desired heat output all through the peak load periods when the electrical heaters are off, the power input to these heaters need not be nearly so large in terms of maximum demand as in the case of electrical heaters without a reserve storage capacity which must be capable of supplying the thermal demand immediately when it is called for. The switch gear for the heating load is greatly simplified as it is merely an on and off control without complicated wiring or switching connections to provide a multiplicity of intermediate heating steps.

Although the present furnace is intended to produce a sufficiently strong hot air circulation by convection alone, the air flow in the duct system may be accelerated by a fan regulated by suitable conventional controls if desired.

Various other changes may be made in the construction and arrangement of parts, and all such modifications within the spirit of the appended claims are included in the invention.

Having now described my invention and in what manner the same may be used, what I claim as new and desire to protect by Letters Patent is:

1. An electric furnace comprising an outer casing having side and top walls, an insulating wall extending vertically from said top wall and spaced within said casing side walls to provide an air return space therebetween, heat storage means enclosed within said insulating wall, electrical heating means to heat said heat storage means, a hot air duct communicating with said heat storage means to convey hot air from said furnace, a return air duct communicating with said air return space, and an air passage from said air return space to said heat storage means.

2. An electric furnace comprising an outer casing, a heating chamber within said outer casing and separated therefrom by an insulating wall spaced from said outer casing to provide an air return space therebetween, an air passage between said air return space and said heating chamber, heat storage means in said heating chamber, electrical heating means to heat said heat storage means, a hot air duct communicating with said heating chamber, and a return air duct communicating with said air return space.

3. An electric furnace comprising an outer casing, a heating chamber enclosed within said outer casing by an insulating wall spaced from said casing to provide an air return space therebetween, an air passage between said air return space and said heating chamber, heat storage means in said heating chamber, electrical heating means to heat said heat storage means, an insulated hot air space adjacent said heating chamber adapted for connection with hot air ducts, and an insulated damper between said heating chamber and said hot air space to regulate hot air flow from said heating chamber.

4. An electric furnace comprising an outer casing, a heating chamber having insulating side walls within said outer casing, an apertured insulating wall in the top of said heating chamber, apertured heat storage means in said heating chamber adapted to heat air and pass it upwardly through said apertured top wall, electric heating means to heat said heat storage means, an insulated hot air distribution chamber within said insulating side walls and above said apertured top wall, a sliding insulated damper in said distribution chamber adapted to open the apertures in said top wall in varying amounts to regulate the flow of hot air therethrough and to completely close said apertures to prevent the flow of hot air and to insulate said distribution chamber from said heating chamber, means to connect a hot air duct system with said hot air distribution chamber, and means to admit a return air circulation into the bottom of said heating chamber.

5. In an electric furnace, an insulated heating chamber containing a stack of apertured heat storage blocks adapted to pass an air flow therethrough and to heat said air in the course of its passage, electrical heating means incorporated in the bottom block and exposed to said air flow for heating said blocks, and a heat insulating damper adapted in one position to close said chamber to prevent the escape of hot air therefrom and adapted for movement to different open positions to regulate a flow of hot air therefrom, and a hot air space for receiving hot air through said damper for distribution to a hot air duct system.

6. In an electric furnace, an insulated heating chamber, a tier of heat storage blocks in said chamber having vertical openings to promote convection current of hot air therethrough when said blocks are heated, electrical heating means in the openings of the bottom block for heating said blocks, an insulating damper at the top of said chamber above said tier of blocks for regulating the hot air flow from said heating chamber to a hot air duct system, and means for admitting an air return flow under said tier of blocks to enter said openings.

7. In an electric furnace, an insulated heating chamber, a tier of heat storage blocks in said chamber having flat top and bottom surfaces and having aligned vertical openings to promote rising hot air convection current therethrough when said blocks are heated, and electrical heating means for heating the bottom block of said tier.

8. In an electric furnace, an insulated heating chamber, a tier of heat storage blocks in said chamber having aligned vertical openings to promote hot air convection currents therethrough when the blocks are heated, and electrical heating means arranged in the openings of the bottom block of the tier to heat said bottom block and also to directly heat air passing therethrough.

9. In an electric furnace, an insulated heating chamber, a series of heat storage blocks having vertical openings therethrough, a frame in said heating chamber for supporting said blocks in a tier with the openings in the different blocks aligned to promote rising convection currents of hot air therethrough when the blocks are heated, the bottom of said tier of blocks being spaced above the floor of the furnace to admit a return air circulation into said openings from beneath, and electrical heating means within the openings of the bottom block of the tier.

10. In an electric furnace, a plurality of heat storage blocks, a frame adapted to support a plurality of tiers of such blocks to promote convection currents of hot air when the blocks are heated, the bottom block of each tier being supported at a distance above the floor of the furnace, and electrical heating means incorporated in the bottom block in each tier.

11. An electric furnace comprising a plurality of tiers of heat storage blocks having vertically aligned openings to promote hot air convection currents therethrough when the blocks are heated, electric heating means associated with the bottom block in each tier, a frame for supporting said tiers of blocks above the floor of the furnace, a vertical insulating wall surrounding said frame and having its lower edge spaced above the floor of the furnace, a horizontal apertured insulating partition above said blocks to define a heating chamber beneath said partition and a hot air chamber above said partition adapted for connection with a hot air duct system, an insulating sliding damper on said partition to open and close said apertures to regulate the flow of hot air from said heating chamber into said duct system, and a casing surrounding the insulating walls of said heating chamber in spaced relation to provide an air return space to admit air under the lower edge of said insulating wall and beneath said bottom blocks.

NIXON O'NEIL CHRISTY.

REFERENCES CITED

The following references are of record in the file of this patent:

UNITED STATES PATENTS

| Number | Name | Date |
|---|---|---|
| 2,266,257 | Osterheld | Dec. 16, 1941 |

OTHER REFERENCES

Dana et al., Eng'g. Bull., No. 46, State College of Washington, June 21, 1935.